July 1, 1930.  J. M. GWINN, JR  1,769,573
ATTACHMENT CLAMP
Filed April 27, 1928

INVENTOR
Joseph M. Gwinn Jr
BY Marechal and Noe
ATTORNEY

Patented July 1, 1930

1,769,573

UNITED STATES PATENT OFFICE

JOSEPH M. GWINN, JR., OF BUFFALO, NEW YORK, ASSIGNOR TO CONSOLIDATED AIRCRAFT CORPORATION, OF BUFFALO, NEW YORK, A CORPORATION OF NEW YORK

ATTACHMENT CLAMP

Application filed April 27, 1928. Serial No. 273,254.

This invention relates to attachment clamps used in the construction of aircraft fuselages, sustaining surfaces, and the like.

One object of the invention is the provision of an attachment clamp adapted to be used in conjunction with a fuselage tube or the like, having holding means for fixing or clamping it to the tube, and having an additional article-fastening device operable without effecting the clamping action of the holding means.

Another object of the invention is the provision of an attachment clamp formed as a single metal stamping having integral rigidifying ears at its ends, and having novel means for holding the clamp in position.

Further objects and advantages of the invention will be apparent from the following description and from the accompanying drawings in which—

Figures 4, 5:
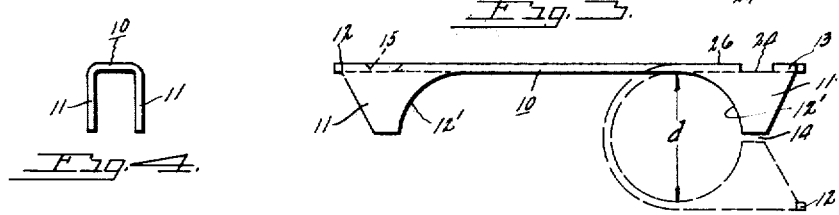
Fig. 4 is an end view thereof.
Fig. 5 is a side view of the stamping shown in Fig. 3 showing in dotted-line position how the stamping is bent around a tube.
Figure 7:
Fig. 7 is a detail of an article-fastening screw.
Figure 6:
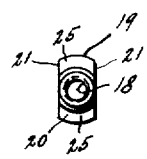
Fig. 6 is an end view of the holding nut.

Referring more particularly to the drawings by reference numerals 10 indicates a metal strap or clamp preferably in the form of an integral stamping of steel or the like, this strap having outwardly bent integral ears 11 on opposite sides of each of the end portions 12 and 13. The strap 10 is adapted to be bent into substantially U-shape as shown in Fig. 5 in the dotted-line position, so that it may extend around a pipe or tube having an outside diameter $d$ equal to the inside diameter of the clamp. The rigidifying ears 11 are arcuately curved as indicated at 12' to conform to the tube curvature and the clamp thus engages substantially throughout its length with the pipe or tube on which it is mounted. The rigidifying ears 11 are of such length as to leave only a small space 14 between adjacent ear ends so that it will be impossible to draw the ends of the clamp close enough together to cause the collapse of the tube on which the clamp is used.

The end 12 of the clamp is provided with a hole 15, which may be countersunk as in the embodiment of the invention herein chosen for purposes of illustration. A screw 16 is provided with a head 17 receivable in the hole 15 of the strap end, the screw having a threaded shank which engages internal threads 18 extending throughout the length of an elongated holding means or nut 19. This nut 19 has a head 20, the opposite flat sides 21 of which are adapted to neatly fit between the sides 22 of a socket 23 provided in the end 13 of strap 10. The socket 23 in the strap end extends entirely across the strap so that the two depressed ledges 24 on the strap sides are adapted to receive the sides 25 of the nut head to limit axial movement of the nut in the direction of the ears 11. The depth of the nut head preferably corresponds approximately with the depth of the socket 23 so that the outer side of the nut head will be substantially flush with the flat outer side 26 of the adjacent strap end.

The screw 16 is preferably of a length somewhat less than the distance across the strap ends so that it may be threaded within the inner end of the nut which engages the other end of the strap, and the strap may thus be clamped tightly in place on the tube, the two holding means being tightened relatively by rotation of the screw 16 while the nut is held against rotation by reason of the series of straight sides of the socket 23. As previously mentioned the strap cannot be tightened sufficiently to cause the collapse of the tube since the space 14 between the adjacent ears when the strap is in place, although large enough to permit the clamp to be fixed tightly on the tube without causing the engagement of opposite ears, is sufficiently small to permit the adjacent ears to touch one another before the clamp can be drawn up so tight as to cause the collapse of the tube.

Figure 1:
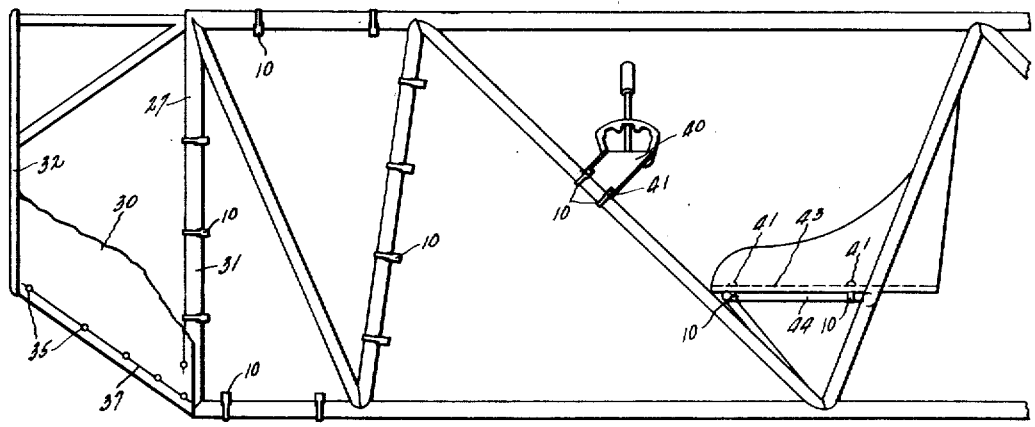
Fig. 1 is a side elevation of a fuselage frame embodying a number of attachment clamps of the present invention.
Figure 3:
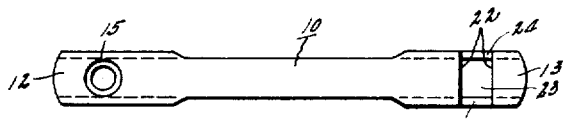
Fig. 3 is a detail view of a clamp stamping of the present invention.
Figure 2:
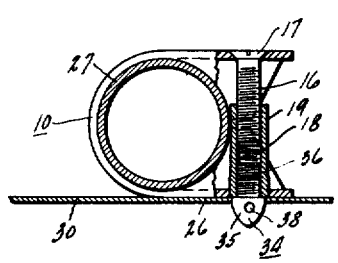
Fig. 2 is a section taken through the center of the clamp transversely of the tube on which the clamp is held.

The clamp is particularly adaptable to serve as a means for fastening articles of different kinds in place on the tubular fuselage framework of an airplane. The stampings can be turned out very cheaply in large quantities and of standard sizes corresponding to the few standard tube sizes of the fuselage. It is quite difficult to attach articles by welding or by bolting directly to the fuselage tube and the form of attachment heretofore used has been quite unsatisfactory due to the weakening of the tubes where they are drilled to receive attaching bolts. However, the standard attachment clamp of the present invention permits articles to be fastened in any place desired along the tubes without weakening the tubes and without requiring a permanent attachment like a weld. Figs. 1 and 2 show how a cowling sheet 30 can be very easily and detachably held on the fuselage frame 31, formed of a series of hollow steel tubes welded together at their ends into a rigid form defining structure. The customary engine support 32 is provided at the front of the fuselage, and the space just back of the engine station is usually cowled or enclosed by metal cowling sheets which are preferably detachably fastened to the fuselage. In accordance with the present invention the forward part of the fuselage frame is provided with a series of the clamps 10 these clamps being fixed on the fuselage frame tubes 27 in positions corresponding to the positions of the holes in the cowling sheet 30 which is stamped to fit a side of the fuselage. The clamps are so positioned on the fuselage frame tubes 27 as to bring the head of the nut, and the end 13 of the clamp flush with the outer side of the fuselage so that the cowling sheet 30 may be applied along the flat side 26 of the clamp and held in position by the article-fastening device 34 which, as shown, comprises a head 35 and a threaded shank portion 36 which engages the threads 18 on the inside of the nut 19. These article-fastening devices 34 are screwed in place into the head ends of the various nuts on the various clamps and the cowling sheet 30, which is provided with holes slightly larger than the outer diameters of the heads 35 of these article-fastening devices, is then placed over the various heads 35 and locked in place by retaining pins 37 which extend through holes 38 provided in the heads of the article-fastening devices in such position as to hold the cowling sheet 30 tight against the adjacent clamp end. It will be apparent that the article-fastening devices 34 are inserted, tightened or loosened, or entirely withdrawn without altering in any way the holding effect of the holding screw 16 and nut 19. However if the cowling sheet has been improperly stamped, and one or more of the holes do not exactly correspond with the head of the article-fastening device, the clamp can be very easily shifted along the fuselage frame tube by first loosening the screw 16 to loosen the clamp, and then sliding the clamp along the tube to the proper position.

The clamp is adapted to hold articles of all sorts to the fuselage frame, and in Fig. 1 the throttle-control bracket 40 is shown supported by a pair of the attachment clamps, the bracket 40 being held by article-fastening devices or screws 41 which are adapted to be screwed into the nut 19 through the head end of the latter. Similar article-fastening devices 41 serve to fasten the seat frame 43 to the tube 44 of the fuselage frame. In this construction the clamp 10 is fastened to the tube 44 with the nut head on the upper side of the clamp. Then the screw 41 having a suitable head 42 and threaded shank adapted to engage the internal threads 18 on the nut, and having a length equal to the thickness of the seat plate 43 plus about one-third of the length of the nut 19, is screwed into the nut through a hole in the seat frame 43 which is thus firmly fixed in position. The seat plate 43 can be readily removed without altering the position of the attachment clamps on the tubes 44. The invention is susceptible of a great many adaptations where articles of various kinds are to be fastened to a tubular frame of the character mentioned, and the articles are held in a manner which permits their quick detachment and without altering the clamping action on the tube to which the clamp is attached. However the construction is such that should a clamp be found to be improperly placed on the fuselage tube it can readily be moved, and can be moved without disconnecting the article which may be held at that time, since the screw 16 engages the nut 19 entirely independently of the engagement of the article-fastening screw or member.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An attachment clamp of the class described comprising a metal strap adapted to be bent into U-shape and having ends provided with rigidifying ears, one of said ends having a straight sided socket, and the other end having a hole, a screw received in said hole, a nut in threaded engagement with said screw and having a head retained in said socket so that rotation and axial movements thereof are prevented, and an article-fastening device having a threaded shank engaging said nut.

2. An attachment clamp of the class described comprising a metal strap adapted to be bent into U-shape and having ends provided with rigidifying ears, one of said ends having a straight sided socket, and the other end having a hole, a screw received in said hole, a nut in threaded engagement with said screw and having a head retained in said socket flush with outer side of the strap, and an article-fastening device having a threaded shank engaging the head end of said nut.

3. An attachment clamp of the class described comprising a metal stamping having a central arcuately curved portion and flat ends, rigidifying ears at each end thereof said ears each having an arcuate side corresponding to the curvature of the clamp and extending to adjacent positions when the clamp is in place, and a pair of holding means in threaded engagement with each other and each having a head engaging an end of the clamp for holding the clamp fixedly in place, one of said holding means comprising an internally threaded elongated nut having a head socketed in the end of the clamp, and an article-fastening screw in threaded engagement with said nut and in alignment with the other of said holding means on the opposite side of the nut, said article-fastening screw having a head adapted to clamp an article against the adjacent flat side of the clamp.

In testimony whereof I hereto affix my signature.

JOSEPH M. GWINN, Jr.

CERTIFICATE OF CORRECTION.

Patent No. 1,769,573.   Granted July 1, 1930, to

JOSEPH M. GWINN, JR.

It is hereby certified that the State of Incorporation of the assignee in the above numbered patent was erroneously given as "New York", whereas said State should have been given as Delaware, as shown by the records of assignments in this office; and that the said Letters Patent should be read with this correction therein that the same may conform to the record of the case in the Patent Office.

Signed and sealed this 2nd day of September, A. D. 1930.

(Seal)

M. J. Moore,
Acting Commissioner of Patents.

ends having a straight sided socket, and the other end having a hole, a screw received in said hole, a nut in threaded engagement with said screw and having a head retained in said socket so that rotation and axial movements thereof are prevented, and an article-fastening device having a threaded shank engaging said nut.

2. An attachment clamp of the class described comprising a metal strap adapted to be bent into U-shape and having ends provided with rigidifying ears, one of said ends having a straight sided socket, and the other end having a hole, a screw received in said hole, a nut in threaded engagement with said screw and having a head retained in said socket flush with outer side of the strap, and an article-fastening device having a threaded shank engaging the head end of said nut.

3. An attachment clamp of the class described comprising a metal stamping having a central arcuately curved portion and flat ends, rigidifying ears at each end thereof said ears each having an arcuate side corresponding to the curvature of the clamp and extending to adjacent positions when the clamp is in place, and a pair of holding means in threaded engagement with each other and each having a head engaging an end of the clamp for holding the clamp fixedly in place, one of said holding means comprising an internally threaded elongated nut having a head socketed in the end of the clamp, and an article-fastening screw in threaded engagement with said nut and in alignment with the other of said holding means on the opposite side of the nut, said article-fastening screw having a head adapted to clamp an article against the adjacent flat side of the clamp.

In testimony whereof I hereto affix my signature.

JOSEPH M. GWINN, Jr.

CERTIFICATE OF CORRECTION.

Patent No. 1,769,573.  Granted July 1, 1930, to

JOSEPH M. GWINN, JR.

It is hereby certified that the State of Incorporation of the assignee in the above numbered patent was erroneously given as "New York", whereas said State should have been given as Delaware, as shown by the records of assignments in this office; and that the said Letters Patent should be read with this correction therein that the same may conform to the record of the case in the Patent Office.

Signed and sealed this 2nd day of September, A. D. 1930.

(Seal)

M. J. Moore,
Acting Commissioner of Patents.